UNITED STATES PATENT OFFICE.

WILLIAM ADAMSON AND CHARLES F. A. SIMONIN, OF PHILADELPHIA, PA.

IMPROVEMENT IN EXTRACTING OIL FROM COTTON AND OTHER SEEDS.

Specification forming part of Letters Patent No. 149,701, dated April 14, 1874; application filed September 2, 1871.

*To all whom it may concern:*

Be it known that we, WILLIAM ADAMSON and CHARLES F. A. SIMONIN, both of Philadelphia, county of Philadelphia, State of Pennsylvania, have invented a Treatment of Cotton and other Seeds, and products of the same, of which the following is a specification:

Our invention consists in extracting oils from seeds, nuts, and other vegetable matter containing oils, by hydrocarbon vapors, under heat and pressure, substantially in the manner described hereafter.

We have ascertained, by repeated tests, that hydrocarbon vapors—those of benzine or benzole, for instance—have most penetrating qualities, and act as powerful solvents when applied under heat and pressure, and when the vapors circulate freely through the material to be treated. Many different forms of apparatus may be employed for carrying our invention into effect, but we will confine our description to the apparatus which we consider the most appropriate.

We use a vessel which serves the purpose both of a still or retort and an extractor, and this vessel may be made of cast or plate iron, of sufficient strength to withstand the pressure to which it has to be subjected. Near the bottom of the vessel, the form and size of which will depend upon the extent to which the process is carried on, we place a perforated diaphragm, and, below the latter, a steam-coil for heating the hydrocarbon, the supply of which may reach or nearly reach the said diaphragm, the liquid being introduced into the vessel through a suitable pipe provided with a cock. On the diaphragm we place the seeds, nuts, or other oily vegetable matter to be treated, the materials being, by preference, crushed prior to their introduction into the vessel. A pipe passes from the vessel, at or near the top of the same, to a condenser, where it assumes the form of a coil or worm, which is continued to the vessel into which the condensed vapors return to be again vaporized. The hydrocarbon is thus used over and over again. In order to maintain any desired pressure within the vessel, we prefer to use a loaded valve in the pipe by which the vapor passes to the condenser, the vessel being furnished with a safety-valve as a provision against accidents. The hydrocarbon being heated by the steam-coil, or otherwise, the vapors will rise and permeate the mass of material on the diaphragm, and will finally pass upward and through the vapor-pipe to the condenser, whence it will return to the still in a liquid form. In the meantime, oily matter will descend to the bottom of the vessel to be withdrawn therefrom, from time to time, through a suitable discharge-cock; and this extract may be redistilled, so as to carry off the hydrocarbons. After the process has been discontinued, the residue may be withdrawn from the vessel through a suitable opening, to which is adapted a detachable cover, this residue consisting of husks and farinaceous matter with more or less vegetable fiber, according to the character of the material treated. The husks may be utilized by employing them as a manure ingredient. The farinaceous matter may be washed and otherwise cleansed and prepared for animal food, and the fiber may be used as paper-stock.

We wish it to be understood that we do not desire to claim, broadly, the extracting of oil from seeds by hydrocarbons, as this process has been practiced prior to our invention; but We restrict our claim to, and desire to secure Letters Patent for—

The process of extracting oils from seeds, &c., by subjecting them to the action of hydrocarbon vapors under pressure, and at a point beyond the reach of the liquid hydrocarbon from which the vapor is generated.

In testimony whereof we have signed our names to this specification in the presence of two subscribing witnesses.

WILLIAM ADAMSON.
CHS. F. A. SIMONIN.

Witnesses:
WM. A. STEEL,
LOUIS BOSWELL.